July 8, 1969  R. R. DETWEILER  3,454,360

PROCESS FOR SULFURIC ACID MANUFACTURE

Filed Oct. 14, 1966

INVENTOR
ROY R. DETWEILER

BY *Norbert F. Reinert*

ATTORNEY

United States Patent Office 3,454,360
Patented July 8, 1969

3,454,360
PROCESS FOR SULFURIC ACID MANUFACTURE
Roy R. Detweiler, Baytown, Tex., assignor to E. I. du Pont de Nemours and Company, Wilmington, Del., a corporation of Delaware
Continuation-in-part of application Ser. No. 376,344, June 19, 1964. This application Oct. 14, 1966, Ser. No. 607,085
Int. Cl. C01b 17/74
U.S. Cl. 23—168                                                4 Claims

ABSTRACT OF THE DISCLOSURE

This specification discloses a process for making sulfuric acid comprising converting sulfur dioxide to sulfur trioxide; adiabatically transferring the sulfur trioxide to an absorber where it is contacted with water to make sulfuric acid; and recovering the sulfuric acid.

---

Figure 1:
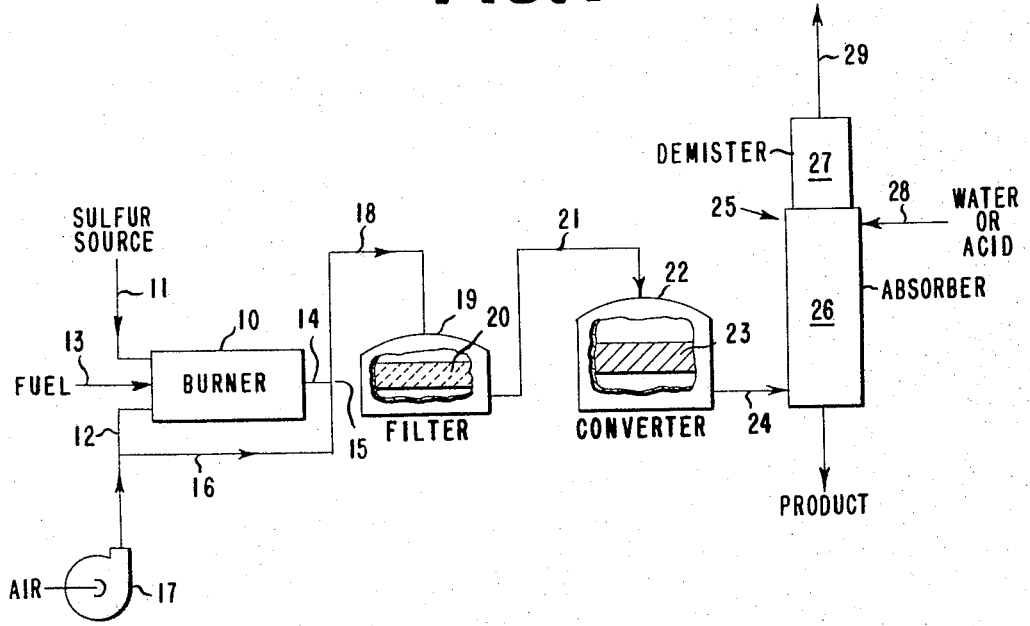

This application is a continuation-in-part of my co-pending application Ser. No. 376,344, filed June 19, 1964, now abandoned.

This invention relates to the manufacture of sulfuric acid. More particularly this invention relates to an improved method for making sulfuric acid by the contact process whereby high conversions can be obtained with a single-pass converter.

The art of producing sulfuric acid is one of the oldest techniques of chemistry. The preferred process in modern day industry for its production is the "contact process." This involves the conversion of $SO_2$ into $SO_3$ in the presence of a catalytic mass, such as vanadium oxide, and a source of oxygen. While the efficiency of this procedure has been developed considerably over the many years of its use, great incentive remains to reduce the high operating and investment cost of the process.

In the operation of the conventional contact process using sulfur as the source of $SO_2$, it is considered necessary to dry the air or other source of oxygen prior to combustion in a burner. The gases leaving the burner are then cooled down to a range of about 400–500° C. by heat exchangers or steam-producing boilers. When the source of $SO_2$ bearing gas is sulfuric acid sludge, spent alkylation acid, or any other sulfur source which yields water on decomposition, the combustion gases leaving the burner must be cooled down to about ambient temperature using high capacity heat exchange equipment. This step removes moisture by condensation and the gases are then further dried, usually by scrubbing with strong sulfuric acid. In the cooling step, acid mist is formed which frequently requires electrostatic precipitators or venturi scrubbers to effect its removal. After the gases are dried, it is necessary to heat the gases by heat exchange to a kindling or reaction temperature in the range of from about 400–500° C. for the conversion of $SO_2$ to $SO_3$ in the presence of catalyst. Using conventional gas strengths of 6–12% by volume $SO_2$ the conversion in a single adiabatic pass over catalyst is limited by thermodynamic equilibrium considerations and usually in order to achieve high conversions two to five passes are required with the need for cooling of the gases by heat exchange or air dilution between passes. The equipment required for predrying gases, removing mist, effecting multiple passes of gases over catalyst with cooling between passes contributes to an increase in the production cost of sulfuric acid by this procedure.

The process of the present invention provides several important improvements over the conventional method of operating the contact process. First, the process of the invention provides for high conversions of $SO_2$ to $SO_3$ in a single adiabatic pass over catalyst, thus eliminating the need for multiple converters and the cooling of reaction gases between the multiple passes with heat exchange equipment. Moreover, this single stage conversion permits the retention of all of the heat of conversion for the concentration of acid in the absorption unit. Secondly, the process of the invention provides for the adiabatic transfer of hot effluent gases from the converter to the absorption unit, eliminating the need for a cooling step between the converter and absorber. Thirdly, the process of the invention eliminates the need for predrying and mist elimination of the gases introduced into the converter, thus simplifying the overall process and reducing the equipment that is required for its operation. These advantages of the process of the invention combine to offer significant savings in operating and investment costs.

The above advantages are obtained in accordance with the present invention by controlling the total amount of oxygen and $SO_2$ in the gaseous stream entering the converter as well as controlling the ratio of oxygen to $SO_2$ in said stream. Additionally, in accordance with the process of the invention the effluent hot gases from the converter are transferred under substantially adiabatic conditions to the absorber where these gases are contacted with water under conditions to condense and absorb them and form sulfuric acid. Finally, the effluent gases from the absorber are treated to remove acid mist which is then returned to the absorber section to be recovered as product acid.

As a part of the present invention it has been found that the rate of reaction of $SO_2$ to $SO_3$ in the contact process is significantly enhanced by a high partial pressure of $O_2$ in a dilute $SO_2$ gaseous feed to the converter as may be noted from the following equation which adequately describes the kinetics of the reaction over a vanadium catalyst:

$$r = \frac{1}{\frac{1}{k}+\frac{1}{Kg}}\left[\frac{O_2-\left(\frac{SO_3}{SO_2 \cdot Kp}\right)^2 \cdot \frac{1}{\pi}}{\left(1+K_1\,SO_2+K_2\,\frac{SO_3}{SO_2}+K_3\,SO_3\right)^2}\right]$$

where $r$ = reaction rate
$k$ = effective rate constant (increase with rising temperature)
$Kg$ = mass transfer rate
$Kp$ = equilibrium constant, $1/\text{atmos.}^{0.5}$
$K_1, K_2, K_3$ = active site coverage factors
$\pi$ = pressure, atmos.
$O_2, SO_2,$ and $SO_3$ refer to the partial pressure (expressed in atmospheres) of these respective components of the gaseous mixture Thus, in accordance with the present invention the gaseous feed to the converted is controlled so that the content of $SO_2$ therein is in a range of from about 0.3% to 4% by volume, preferably 2% to 3% by volume, and the mole ratio of oxygen to $SO_2$ is maintained in a range of from about 3:1 to about 20:1. It also is found important that the content of oxygen in the gaseous feed be at least about 10% by volume in order for the kinetics to proceed rapidly enough to insure single pass conversion of the reaction gases.

It also will be noted from the above equation that high mass transfer rates will enhance the reaction rate as will increased pressure due to the latter's influence on equilibrium and partial pressure of oxygen.

The higher $O_2$ to $SO_2$ ratios specified for the method of the invention increases the reaction rate to an extent which permits a substantial lowering in the "kindling" or entrance temperature to the converter over that heretofore suitable in the practice of the contact process. Accordingly, the kindling temperature may vary widely over the range of 300°–500° C. depending upon gas composition and other variables of the process. Preferably, the temperature will be in the range of from 350–450° C.

The gases leaving the single pass converter following the exothermic reaction of $SO_2$ to $SO_3$ are at a temperature in the range of about 425° C. to about 550° C. In accordance with the present invention, these effluent gases are transferred without any cooling step to a closed absorption tower. The gaseous stream entering the absorber, therefore, is at a temperature which is essentially the same as the temperature of this stream leaving the converter. The hot effluent gases are cooled within the absorber by direct contact with water, preferably passed countercurrent to the flow of hot gases. In this contacting, the $SO_3$ component of the hot gases combines with water both in the form of vapor and liquid, producing sulfuric acid by condensation and absorption. An important feature of the overall process of the invention is that the sensible heat stored in the entering hot gases serves to concentrate the acid thus formed in the absorber before its removal therefrom.

There are no critical temperature requirements as to the specific temperature of the cooling water added to the absorber. Preferably, the water will be at ambient temperatures or cooler because the cooling of the hot gases is accomplished by evaporation of the cooling medium and thus the lower the temperature of the coolant the less coolant that is required. Obviously, therefore, water can be used at temperatures above ambient but due to the foregoing considerations it is not practical to use water at a temperature much above 50° C. If desired, other liquids can be used in place of water as the cooling medium, such as a dilute sulfuric acid having an acid concentration of up to 70%.

The absorber used in the process of the invention includes a mist recovering section wherein the acid mist formed in the absorber is recovered from the effluent gas and returned to the absorbing section from whence it is eventually removed as product sulfuric acid. In effect this acid mist returning to the absorbing section of the unit acts as an enriching reflux aiding in the absorption of $SO_3$ coming from the converter gases.

Figure 2:
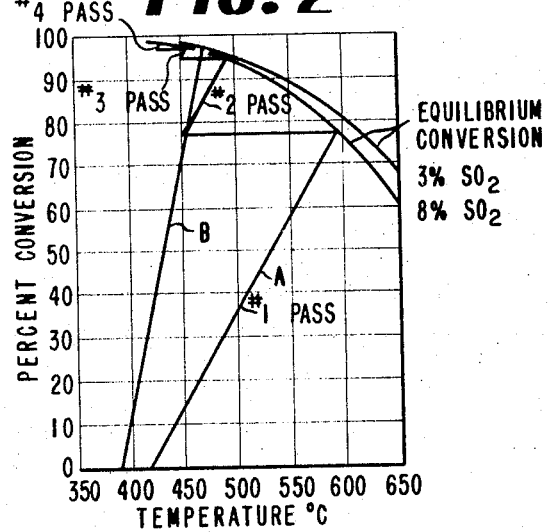

For a more detailed understanding, the invention will be further discussed in conjunction with the appended drawings in which:

FIG. 1 is a schematic layout of a sulfuric acid contact process incorporating the improvements of the invention; and FIG. 2 is an equilibrium conversion diagram on which the single-pass catalyst system of the invention is compared with a four-pass contact catalyst system typical of a conventional sulfuric acid contact process.

Referring to FIG. 1, the reference numeral 10 indicates the burner in which a sulfur source entering the burner via line 11 is burned with air and fuel, such as oil or gas, entering burner 10 via lines 12 and 13, respectively.

The sulfur source may be molten sulfur, sulfuric acid sludge, spent sulfuric acid such as spent alkylation acid, hydrogen sulfide, or a metal sulfide such as zinc sulfide or iron sulfide. The combustion gases leave burner 10 by way of line 14. As an alternate to burner gases obtained in manner just described, $SO_2$ bearing industrial waste gases may be directly supplied to this point of the process. The $SO_2$ bearing gas is then mixed at 15 with air supplied through line 16 by blower 17. The volume of air mixed with the $SO_2$ gas at 15 is sufficient to provide in the gaseous mixture present in line 18 an $O_2$ to $SO_2$ ratio in the range of about 2:1 to about 30:1 and a $SO_2$ content below 5% by volume, preferably in a range of from 2–3% by volume. The gases via line 18 enter filter 19 having one or more bed(s) 20 containing small refractory pellets such as alumina, which effectively remove any particulate matter present in the gaseous stream. The gaseous mixture passing through bed(s) 20 leave filter 19 via line 21 and if necessary adjusted to a temperature in the kindling range of from 350 to 450° C. before entering catalytic converter 22. Within converter 22 contact catalyst is arranged for a single pass conversion by the gaseous feed. The catalyst, which is preferably potassium promoted vanadium oxide, but can be any contact process catalysis which is dependent on oxygen as the driving force in converting $SO_2$ to $SO_3$, is arranged in a single bed 23 or in two or more beds, if desired, but without any intermediate cooling between beds. Conversions of about 98% of $SO_2$ to $SO_3$ are achieved in an exothermic reaction in the presence of the catalyst.

Reaction gases at a temperature in the range of about 425–550° C. leave adiabatic converter 22 through an insulated line 24 so that the gases enter absorber tower 25 having an absorption section 26 and a demister section 27 at about the converter temperature and well above the dewpoint of the gas. Upon entering absorber tower 25 the gases pass up through a packing in the absorption section 26 consisting of quartz, acid-resistant brick, or any material suitable for the temperature, and acidic conditions. The gases are cooled by direct addition of water or dilute acid via line 28 which enters the absorption section at the top of the packing. Gas velocities of 3 to 10 ft./sec. and cooling of the gas stream from a temperature in the range of 425–550° C. to a temperature in the range of 70–120° C. in 2 to 10 seconds are exemplary of conditions in this unit operation of the process.

The $SO_3$ in the gas reacts with water which may be present in the gas phase or in the cooling media to form liquid sulfuric acid. At the same time there is a strong tendency for $SO_3$ to absorb directly in the acid stream to form a concentrated acid. A small portion of the sulfuric acid is formed as a mist and is carried along with the gases leaving absorption section 26. This mist is separated from the gases in a mist separating section 27 of absorber tower 25 by means of any suitable mist eliminator, such as an electrostatic precipitator, coke box, or fiber filter and returned to the absorption section 26. The inert gases leave absorber tower 25 by means of line 29. The liquid acid formed near the top of the packing in absorption section 26 is concentrated as it flows down the packing and leaves by means of product line 30 at strengths of 98.5% or higher depending upon the composition of the incoming gas.

Referring now to FIG. 2, the effect of lower concentrations of $SO_2$ and higher concentrations of $O_2$ in giving higher equilibrium conversions to $SO_3$ in a single pass vanadium catalyst adiabatic converter is plotted in comparison to the path of reaction for a four-pass vanadium catalyst converter. FIG. 2 plots percent conversion against temperature. The upper curve on the plot represents the thermodynamic equilibrium for a gas of 3% by volume $SO_2$ in which the $O_2/SO_2$ mole ratio is 5.3, typical of the process of the invention, while the lower curve represents the thermodynamic equilibrium for a gas of 8% by volume $SO_2$ in which the $O_2/SO_2$ mole ratio is 1.6, typical of a conventional contact process. Line A traces the path of reaction for the four-pass system. Normally the reaction rate in this system is negligible below 400° C. Therefore, an initial kindling temperature between 400° C. and 450° C. is selected (approximately 420° C. on FIG. 2). The slope of line A is determined by the heat capacity of the gas. It can be seen that the percent conversion for each pass over catalyst is fixed by equilibrium considerations. Therefore, pass 1 attains equilibrium at approximately 78% conversion and gas cooling must then be effected for the second pass. By four-passes with intermediate cooling (represented by the horizontal lines on FIG. 2) the over-all conversion or yield approaches equilibrium rather closely and attains approximately 98.5%. Line B traces the path of reaction for the single adiabatic pass typical of the process of the invention. The initial reaction temperature in this system is approximately 390° C. The slope of the line again is determined by the heat capacity of the gas and due to the lower concentration of $SO_2$ and higher concentrations of $O_2$ together with higher concentrations of inerts exhibits a much higher slope than line A. Accordingly, for this one adiabatic pass to equilibrium over the same type vanadium-catalyst as before, a conversion of approximately 98% is achieved.

Utilizing the process scheme described above with reference to FIG. 1, the following working example will illustrate a preferred mode of operation of the invention:

A spent sulfuric acid (composition by weight: 88% $H_2SO_4$; 8.4% carbon and hydrocarbons; 3.6% $H_2O$) is decomposed in a burner maintained at 1000° C. by burning natural gas with air. The gases leaving the burner contain:

|  | Moles/hr. | Vol. percent |
|---|---|---|
| $SO_2$ | 68.88 | 8.68 |
| $SO_3$ | 2.57 | .32 |
| $CO_2$ | 75.39 | 9.50 |
| $O_2$ | 37.30 | 4.70 |
| $N_2$ | 437.25 | 55.10 |
| $H_2O$ | 172.20 | 21.70 |

A slight excess of fuel is burned to assure that the gas entering the converter is at the proper temperature following adjustment of the sulfur dioxide and oxygen contents as described below.

Air is added to reduce the sulfur dioxide content below 3% by volume and to raise the $O_2$ to $SO_2$ ratio to 5.4:1 which is about 1000% more oxygen than is required stoichiometrically for conversion to $SO_3$ and about 200-300% more than that normally used in the conventional contact process.

The gases are passed through a filter containing a ceramic material which serves to remove ash and unburned dust particles, and also to provide a heat sink or reservoir to stabilize the temperature of the gases entering the converter against sudden changes in atmospheric or operating conditions.

The gas temperature is maintained at the kindling temperature of about 390° C. by controlling the amount of dilution air and excess fuel burned. The composition of the gas entering the converter is:

|  | Moles/hr. | Vol. percent |
|---|---|---|
| $SO_2$ | 68.85 | 2.83 |
| $SO_3$ | 2.57 | .11 |
| $CO_2$ | 75.39 | 3.10 |
| $O_2$ | 374.70 | 15.41 |
| $N_2$ | 1706.35 | 70.16 |
| $H_2O$ | 204.20 | 8.40 |

The high $O_2/SO_2$ ratio allows rapid conversion of $SO_2$ to $SO_3$ with a water-insensitive, potassium promoted vanadium catalyst at temperatures of 390° C.

Conversions near 98% are achieved at gas temperatures of 460-470° C. leaving the adiabatic converter. The composition of the gas leaving the converter is:

|  | Moles/hr. | Vol. percent |
|---|---|---|
| $SO_2$ | 1.51 | .06 |
| $SO_3$ | 69.91 | 2.91 |
| $CO_2$ | 75.39 | 3.14 |
| $O_2$ | 341.03 | 14.22 |
| $N_2$ | 1706.35 | 71.15 |
| $H_2O$ | 204.20 | 8.52 |

This gas is introduced, without cooling or other conditioning, into the bottom of the absorber tower, passing up through a ceramic packing. The gas is cooled by spraying water on top of the packing. $SO_3$ gas combines with $H_2O$ (vapor and liquid) producing $H_2SO_4$ (liquid) by condensation and absorption. A portion of the sulfuric acid is formed as a mist and is carried along with the gases leaving the packing. The mist is removed in a mist eliminator utilizing fiber filters of "Teflon®" fiber and returned to the tower. The acid formed in the tower is concentrated to 98.5% $H_2SO_4$ as it passes down over the packing countercurrent to the flow of gas. 69.91 moles/hr. (100% $H_2SO_4$ basis) are produced, leaving the bottom of the tower at a temperature in the range of 290-330° C. and about 98.5% strength.

The gas leaving the mist eliminator is at temperatures of 90-110° C. and essentially free of sulfuric acid and $SO_3$ vapors or mist as may be noted from the following gas analysis:

|  | Moles/hr. | Vol. percent |
|---|---|---|
| $SO_2$ | 1.51 | .05 |
| $SO_3$ | 0 | 0 |
| $CO_2$ | 75.39 | 2.44 |
| $O_2$ | 341.03 | 11.05 |
| $N_2$ | 1706.35 | 55.30 |
| $H_2O$ | 961.4 | 31.16 |

It will be apparent from the foregoing description that a desirable feature of the invention is the high acid strengths made possible by the large excess of heat available for concentration. This is because no heat is removed from the system at any point except by unavoidable radiation losses from ducts and equipment. Actually, the cumulative sensible heat of the gases entering the converter, the heat of reaction of $SO_2$ to $SO_3$, the reaction of $SO_3$ with $H_2O$ to form liquid sulfuric and to some extent the heat of dilution of sulfuric acid in with water are available for concentration.

Accordingly, in the working example above-described, cooling in the tower also can be accomplished by evaporating water from a weak sulfuric acid. For example, 214.8 moles/hr. (100% $H_2SO_4$ basis) of a 70% $H_2SO_4$ spent acid can be concentrated to 98.5% strength by the gas entering the absorbing tower, resulting in a total acid production of 284.7 moles/hr. (100% $H_2SO_4$ basis).

Since many different embodiments of the invention may be made without departing from the spirit and scope thereof, it is to be understood that the invention is not limited by the specific illustrations hereinabove set forth except to the extent defined in the following claims.

I claim:
1. A method for the manufacture of sulfuric acid comprising introducing a gaseous mixture at a temperature within a range of 350 to 450° C. into a catalytic chamber containing a catalyst mass for the oxidation of $SO_2$ to $SO_3$, said gaseous mixture being an oxygen enriched $SO_2$ bearing burner gas having an $O_2$ content of at least 10% by volume, an $SO_2$ content in the range of 0.3 to 4% by volume and an $O_2$ to $SO_2$ mole ratio from 3:1 to 20:1; converting the bulk of the $SO_2$ in said gaseous mixture to $SO_3$ by a single adiabatic pass of said gaseous mixture over said catalyst mass; transferring the effluent gases from said catalytic chamber to an absorption chamber under adiabatic conditions; contacting said effluent gases in said absorption chamber with a source of water whereby said effluent gases are rapidly cooled and the $SO_3$ component of said effluent gases is combined with water and concentrated to form sulfuric acid; recovering acid mist from the effluent gas from said absorption chamber and withdrawing sulfuric acid from said absorption chamber.

2. A method for the manufacture of sulfuric acid which comprises admixing air with burner gases containing $SO_2$ to give a gaseous mixture having an $O_2$ content of at least 10% by volume, an $SO_2$ content in the range of from 0.3 to 4% by volume and an $O_2$ to $SO_2$ mole ratio in the range of from 3:1 to 20:1; introducing said gaseous mixture at a temperature within the range of 350 to 450° C. into a catalytic chamber containing a catalyst mass for the oxidation of $SO_2$ to $SO_3$; converting the bulk of the $SO_2$ in said gaseous mixture to $SO_3$ by a single adiabatic pass of said gaseous mixture over said catalyst mass; transferring the effluent gases from said catalytic chamber to an absorption chamber under adiabatic conditions; introducing water into said absorption chamber at a temperature below 50° C.; and directly contacting said effluent gases with said water whereby said effluent gases are rapidly cooled and the $SO_3$ component of said effluent gases is combined with water to form sulfuric acid; recovering acid mist from the effluent gas from said absorption chamber and returning it to said absorption chamber; and withdrawing from said absorption chamber a stream of concentrated sulfuric acid.

3. The method of claim 2 wherein the $SO_2$ content of the gaseous mixture introduced into said catalytic chamber is in the range of from 2 to 3% by volume.

4. The method of claim 3 wherein the catalyst mass is a vanadium catalyst.

References Cited

UNITED STATES PATENTS

| | | | |
|---|---|---|---|
| 2,115,091 | 4/1938 | Von Girsewald et al. | 23—168 |
| 2,142,855 | 1/1939 | Laury | 23—175 |
| 2,172,617 | 9/1939 | Kooman et al. | 23—175 |
| 2,879,135 | 3/1959 | Haltmeier | 23—168 |

OTHER REFERENCES

Duecker et al.; "Manufacture of Sulfuric Acid," 1959, TP215 D73, pp. 160, 161 and 166 relied on.

OSCAR R. VERTIZ, *Primary Examiner.*

ARTHUR GREIF, *Assistant Examiner.*